Feb. 7, 1928.
S. MOORE
VEHICLE HEADLIGHT MECHANISM
Filed Jan. 5, 1927
1,658,534
Fig. 1.
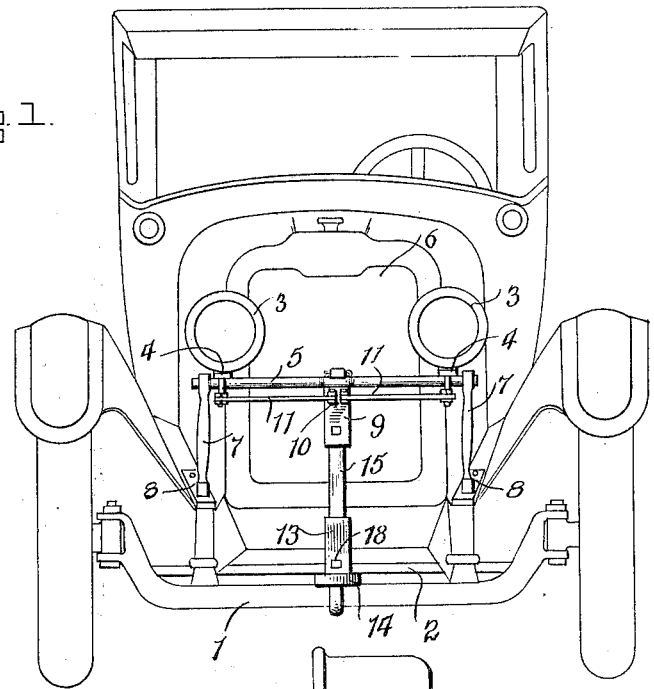
Fig. 2.
Fig. 3.
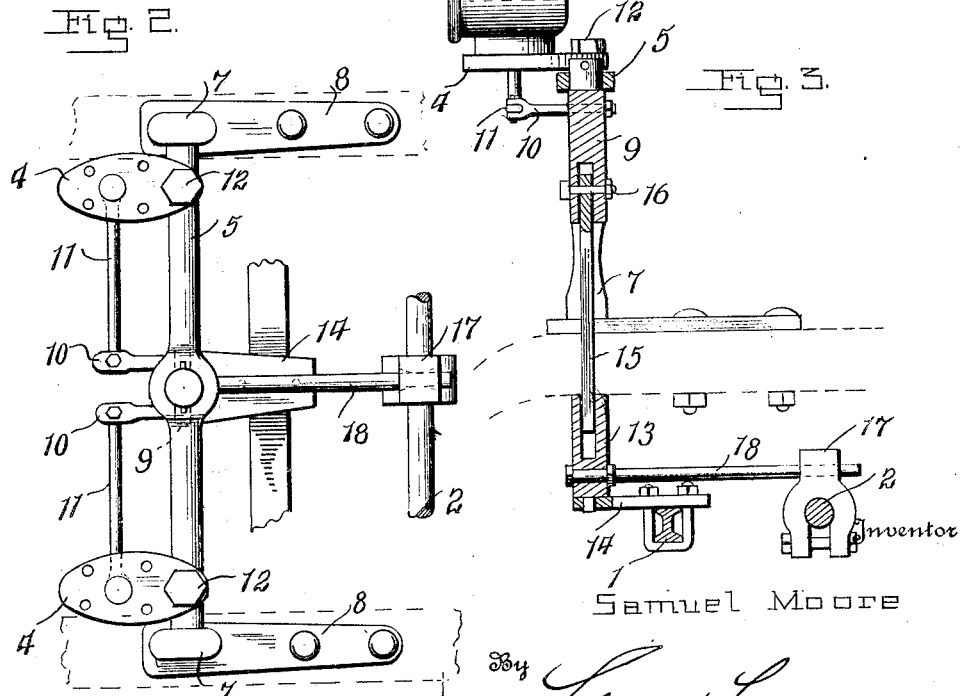
Inventor
Samuel Moore
By Lacey & Lacey, Attorneys Patented Feb. 7, 1928.

1,658,534

UNITED STATES PATENT OFFICE.

SAMUEL MOORE, OF CLEVELAND, OHIO, ASSIGNOR, BY DIRECT AND MESNE ASSIGNMENTS, OF TWO-NINTHS TO ROBERT T. WISE, OF CLEVELAND, OHIO; TWO-NINTHS TO WILLIAM MILLER AND ONE-THIRD TO C. H. SNIDER, BOTH OF FAIRMONT, WEST VIRGINIA.

VEHICLE-HEADLIGHT MECHANISM.

Application filed January 5, 1927. Serial No. 159,178.

It is a desideratum in the operation of automobiles and motor driven vehicles to have the same equipped with headlights which are self-adjusting and controllable from the steering gear of the vehicle, so as to throw the rays of light ahead upon the roadway to illuminate the same when travelling straight ahead, making a turn or bearing to the right or to the left.

Therefore it is the primary intent of the present invention to devise simple and effective means for the attainment of the purpose aforesaid which may be readily applied to an automobile, or other type of motor vehicle, without necessitating any change in the construction thereof or modification in the arrangement of its parts, particularly the steering gear.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a front view of an automobile provided with headlight mechanism embodying the invention.

Figure 2 is a top plan view showing more clearly the mountings and the connections for operating the headlight from the steering gear.

Figure 3 is a detail view in side elevation, partly in section, to bring out more clearly the relationship of the elements.

Corresponding and like parts are referred to in the following description and designated in the several views of the drawings by like reference characters.

The numeral 1 designates the front axle, 2 the drag link connecting the usual arms of the steering knuckles and 3 the headlights. These parts may be of any well known construction. In accordance with the invention the headlights 3 are pivotally mounted so as to turn from side to side about vertical axes. The headlights are secured in any manner to plates 4 which are pivotally mounted upon a cross bar 5 disposed forwardly of the radiator 6 and extending from one side to the other of the vehicle. Posts 7 at opposite sides of the vehicle receive the ends of the cross bar 5 and support the same. The lower ends of the posts 7 are secured to strap irons 8 which are bolted or otherwise secured to the side bars of the chassis. The parts 8, 7 and 5 constitute a supporting frame.

A head block 9 is pivotally mounted at its upper end within the cross bar 5, and arms 10 project forwardly therefrom. Links 11 connect the forward ends of the arms 10 with the plates 4, said links being pivotally connected with the parts 4 and 10 in any determinate way. Any suitable pivot connection 12 may be employed as means for securing the plates 4 to the cross bar 5 in a manner to admit of said plates having a pivotal movement, which is essential to the operativeness of the mechanism. A foot block 13 is pivotally mounted upon an arm 14 clamped or otherwise secured to the axle 1 and a coupling 15 forms connecting means between the two blocks 9 and 13. In the preferred construction the coupling 15 consists of a bar which is positively connected to one of the blocks by means of a fastening 16 and has a loose or sliding connection with the other block, whereby to allow for the vertical movement of the vehicle frame incident to the spring connection between said frame and the axles. The lower end of the bar 15 is of non-circular form in cross section and operates in an opening of like outline formed in the foot block 13. A stud 17 is clamped to the drag link 2 and has an opening formed therein to receive the rear end of a rod 18 which is secured at its forward end to the foot block 13. In this manner provision is had for movement of the drag link without causing interference or binding.

It will be readily understood from the foregoing, reference being had to the accompanying drawings, that the construction is such as to admit of the invention being readily adapted to the average automobile and motor vehicle, without necessitating any change in the construction thereof or any modification of the steering gear, since the strap irons 8 of the supporting frame may be readily bolted or otherwise secured to the side bars of the vehicle frame, and the arm 14 attached to the axle and the stud 17 clamped to the drag link 2. When the vehicle is travelling in a direct line, the headlights project the rays of light straight ahead and when the vehicle makes a turn, either to the right or to the left, the rear end of the rod 18 correspondingly moves with the drag link 2 forming a part of the steering gear, and the adjustable connection comprising the parts 9, 15 and 13, correspondingly turns and effects a turning of the headlights, whereby to throw the light to illuminate the roadway to admit of a view thereof so as to avoid a casualty.

Having thus described the invention, I claim:

A headlight mechanism comprising a supporting frame including a cross bar, posts and strap irons, the latter adapted to be bolted to the side bars of the vehicle frame, plates pivotally mounted upon end portions of the cross bar and receiving the headlights, an arm projected from the axle, blocks pivotally mounted in the cross bar and arm, a coupling adjustably connecting said blocks, a stud fast to the drag link, a rod secured to the lower block and loosely engaging an opening formed in the said stud, arms projecting from the upper block, and links connecting the last mentioned arms to the plates carrying the headlights.

In testimony whereof I affix my signature.

SAMUEL MOORE. [L. S.]